United States Patent [19]
Porsche et al.

[11] 3,771,807
[45] Nov. 13, 1973

[54] SUPPORTING FRAME OF A ONE-TRACK SLIDING VEHICLE

[75] Inventors: Ferdinand Alexander Porsche, Doffingen; Theodor Bauer, Leinfelden, both of Germany

[73] Assignee: Firma Dr.-Ing .h.c.f. Porsche K.G., Stuttgart-Zuffenhausen, Germany

[22] Filed: Oct. 28, 1971

[21] Appl. No.: 193,592

Related U.S. Application Data
[63] Continuation of Ser. No. 835,940, June 24, 1969.

[30] Foreign Application Priority Data
Aug. 2, 1968 Germany............... P 17 80 122.8

[52] U.S. Cl. ................................................. 280/16
[51] Int. Cl............................................. B62b 13/04
[58] Field of Search...................... 280/16, 15, 21 R, 280/21 A, 12 R; 9/310 C

[56] References Cited
UNITED STATES PATENTS
3,425,707  2/1969  Horiuchi............................ 280/16
2,883,205  4/1959  Dulski................................. 280/16
3,398,970  8/1968  Horiuchi............................ 280/16

Primary Examiner—Kenneth H. Betts
Assistant Examiner—Robert R. Song
Attorney—Craig, Antonelli and Hill

[57] ABSTRACT

A one-track, steerable sliding vehicle or sled consisting essentially of a supporting frame with a front and rear runner attached thereto and a steering mechanism. The steering mechanism is associated with the front runner and the rear runner is connected to the frame by guide and/or spring elements. The supporting frame is formed of a one-part or multipartite, rigid hollow body manufactured from a synthetic material which, on one hand, can withstand all stresses and loads during driving and, on the other hand, can be easily transported.

25 Claims, 4 Drawing Figures

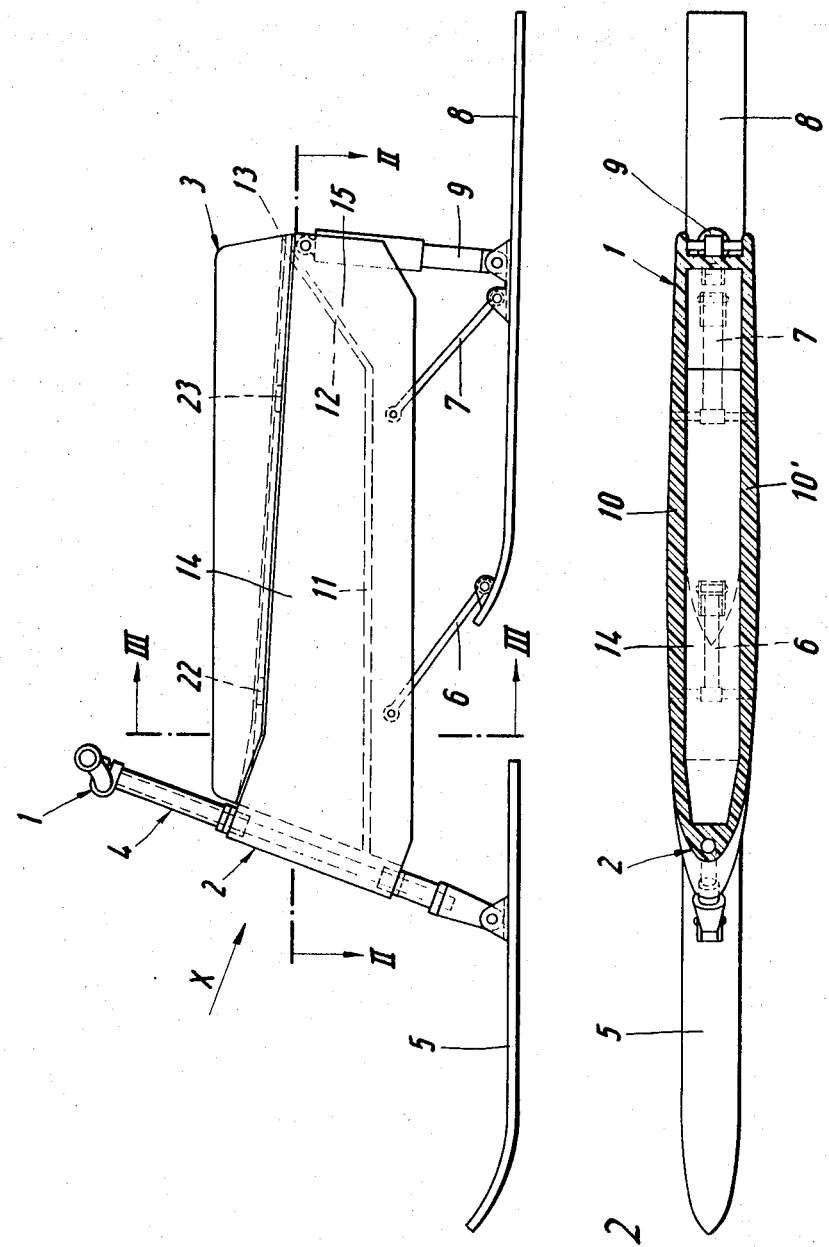

SUPPORTING FRAME OF A ONE-TRACK SLIDING VEHICLE

This is a continuation application of copending U.S. application Ser. No. 835,940, filed June 24, 1969.

BACKGROUND OF THE INVENTION

The present invention relates to a one-track sliding vehicle or sled, and more particularly, to a sled with a supporting frame provided with runners and a steering mechanism.

One-track sliding vehicles which employ a seat, steering mechanism and runners attached to an elliptical frame exhibiting a box-shaped cross section and provided with a recess are conventional. However, with this arrangement, it has been impossible to manufacture the frame in an economical manner, due to the large amount of cut-to-order operations and because of the high amount of discarded waste material produced when providing the recess of the lateral parts. Furthermore, it is extremely difficult to transport this sled in cable cars, automobiles, etc., since the bulky steering mechanism is not detachably mounted thereon. In another type of conventional sliding vehicle or sled, the frame is a tubular support which is collapsible. Although the sled can thereby be transported more readily, there is always the danger that the driver, during a fall, can get his extremities tangled up in the tubular frame and be seriously injured thereby. Furthermore, both constructions have the disadvantage that, during driving, it is impossible for the driver to support or influence the steering action of the sled with his knees, since the frames of such sleds are built extremely narrow.

SUMMARY OF THE INVENTION

It is the aim of the present invention to overcome the above-mentioned disadvantages by providing a one-track, steerable sliding vehicle with a supporting frame which can withstand all stresses during driving, and which can be manufactured economically. The supporting body or frame of the present invention is also constructed of such a shape that it can be easily transported without being bothersome to other persons.

The underlying problems are solved in accordance with the present invention by constructing the supporting frame of a one-part or multipartite, inherently rigid hollow body manufactured from a synthetic material. Thereby, an extremely rigid supporting frame, which can be made relatively thin-walled and therefore a lightweight, can be manufactured economically. Furthermore, in the sled according to the present invention, it is possible for the driver to brace his knees firmly against the supporting frame and thereby additional influence the steering of the sled. The outer walls of the supporting frame are mutually braced or supported by connecting walls. In addition, the outer walls and the connecting walls form hollow spaces which are accessible from the outside. With this construction, it is not only possible to accommodate, in a hidden manner, the various components for guiding and resiliently supporting the runner during transportation of the sled, but there is also provided an easily accessible storage space for accommodating miscellaneous articles.

The supporting frame is further provided with an upholstered seat which is attached to the hollow body in a collapsible or foldable manner and which closes off at least one cavity of the supporting frame. Because of this arrangement, a functional seat extends over the entire length of the supporting frame. At the same time, however, the seat is also constructed as a lid which closes off an extremely large hollow space, wherein bulky parts of the sled can be stored during transportation of the sled or wherein articles of clothing or the like belonging to the driver can be satisfactorily accommodated.

Preferably, the supporting frame has a groove or channel member on its underside to accommodate the guiding and/or spring elements. An additional advantage results when the supporting frame, which is adapted to receive the steering mechanism, is provided with a supporting tube extending along the entire height of the supporting frame. This has the effect, on one hand, that the bow portion of the supporting frame has a very strong and rugged construction, and, on the other hand, no additional mounting parts for the steering mechanism are required. The supporting tube of the supporting frame is provided with socket means such as bushings or sleeves at both ends for the guidance of a steering column of the steering mechanism. Accordingly, a functionally correct mounting of the steering mechanism is made possible thereby.

Accordingly, it is an object of the present invention to provide a one-track, steerable sliding vehicle having a supporting frame which can withstand all stresses during driving.

Another object of the present invention is in making possible the economical manufacture of a one-track, steerable sliding vehicle with a supporting frame.

A further object of the present invention is to provide a one-track, steerable sliding vehicle which employs a supporting frame of such a shape that it can easily be transported without being bothersome to other persons.

A further object of the present invention is to provide a supporting frame of a one-track, steerable sliding vehicle which can be made relatively thin-walled and therefore of lightweight and which allows the driver to additionally influence the steering of the sled by bracing his knees firmly thereagainst.

A still further object of the present invention is to provide a one-track, steerable sliding vehicle with a supporting frame and a hingedly mounted upholstered seat which allows the steering mechanism or miscellaneous articles to be stored during the transportation of the vehicle.

A still further object of the present invention is to provide a one-track, steerable sliding vehicle with a supporting frame which has a supporting tube extending along the entire height of the supporting frame, thereby imparting strong and rugged qualities to the supporting frame and also obviating the necessity for additional mounting parts for the steering mechanism.

Another object of the present invention is to provide the supporting tube of the supporting frame of a one-track, steerable sliding vehicle with sockets at both ends for the guidance of a steering column, which permits a functionally correct mounting of the steering mechanism.

BRIEF DESCRIPTION OF THE DRAWINGS

These and further objects, features and advantages of the present invention will become more obvious from the following description when taken in connection with the accompanying drawing which shows, for purposes of illustration only, an embodiment in accordance with the present invention, and wherein:

FIG. 1 shows a lateral view of a sled according to the present invention;

FIG. 2 is a sectional view along the line II—II of FIG. 1;

DETAILED DESCRIPTION OF THE DRAWINGS

Figure 4:
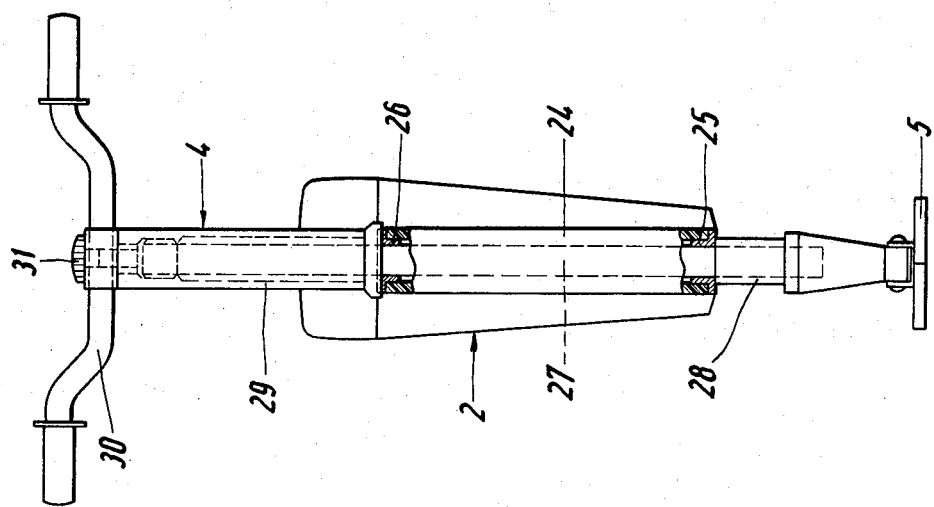
FIG. 4 is a partial sectional view, in the direction of arrow X as shown in FIG. 1, on an enlarged scale.

The sled or sliding vehicle, as shown in FIG. 1, comprises generally a supporting frame 2 and an upholstered seat 3 attached in the upper zone of the frame. The upholstered seat 3 extends substantially over the entire length of the sled 1. A steering mechanism 4 with a front runner 5 pivotally mounted thereat cooperates with the supporting frame 2. Furthermore, a rear runner 8 is hingedly mounted to the supporting frame 2 by means of guide members 6, 7. The rear runner 8 cooperates with a spring element 9, which is supported against the supporting frame 2 of the sled 1.

The supporting frame 2, as shown in FIGS. 1 and 2, is formed by a hollow body made of synthetic material and comprises smooth and relatively thin side walls 10, 10' which diverge in the rear zone and converge in the front zone of the sled 1. The side walls 10, 10' of the supporting frame 2 are connected with each other by means of connecting walls 11, 12, 13 in such a manner that hollow spaces 14, 15 are formed. The walls defining the hollow spaces 15 form a groove or channel and are provided with bearings for holding the guide members 6, 7 and the spring element 9 for the rear runner 8.

Figure 3:
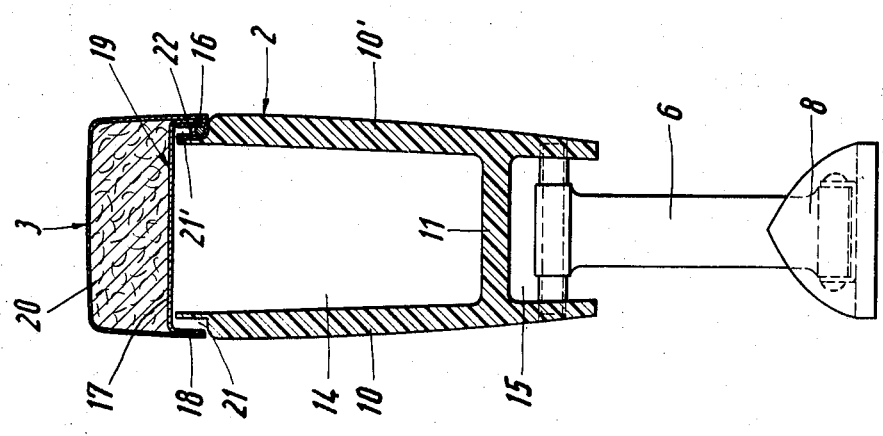
FIG. 3 is a sectional view along the line III—III of FIG. 1 on an enlarged scale.

In accordance with FIG. 3, the hollow space 14 of the supporting frame 2 is accessible from above and is sealed off by the upholstered seat 3. The upholstered seat 3 comprises a sheet metal box 19 formed by rounded off bends 16, 17, 18. The sheet metal box 19 is provided with an upholstered pillow 20 consisting of a foam material or the like. The rounded off bends 16 and 18 extend, with their free ends, into the recesses 21, 21' provided in the side walls 10, 10' of the supporting frame 2. In addition, the seat can be flipped or folded over sideways by means of the hinges 22, 23. The hinges are affixed, by means of conventional connecting means such as rivets or the like, to the side wall 10' of the supporting frame 2 and to the bent wall 16 of the sheet metal box 19.

As shown in FIG. 4, a supporting tube 24 having sockets 25, 26 at the ends thereof is provided at the front zone or region of the supporting frame 2. The sockets 25, 26 are manufactured, in accordance with the embodiment, of a suitable synthetic material and affixed in the supporting tube 24 of the supporting frame 2 by conventional bonding means such as cementing. The supporting tube 24 receives a steering column 27 of the steering mechanism 4 which is held in its position by means of an abutment or stop part 28 and a supporting member 29 within the supporting tube 24. The abutment part 28 is fixedly connected to the steering column 27 and rests on the socket 25. The supporting member 29 which cooperates with the socket 26 includes a steering means such as a handlebar or steering handle 30 which is retained by means of a threaded cap or screw cap 31 which can be by means of a threaded operated by a hand.

The steering mechanism 4 can therefore be detached from the supporting frame when it is desired to transport the sliding vehicle 1. When so detached from the supporting frame, the parts of the steering mechanism can be easily accommodated in the hollow space 14 which serves as a storage compartment.

While we have shown and described only one embodiment in accordance with the present invention, it is understood that the same is not limited thereto but is susceptible of numerous changes and modifications as known to a person skilled in the art, and we, therefore, do not wish to be limited to the details shown and described herein but intend to cover all such changes and modifications as encompassed by the scope of the invention.

We claim:

1. A one-track sliding vehicle comprising: a supporting frame, at least one runner, guide member means connecting at least one of said at least one runners to said supporting frame, a steering mechanism connected to said supporting frame, and a seat connected to said supporting frame; wherein said supporting frame includes a pair of side walls extending rearwardly from said steering mechanism to the rear end portion of the frame in a substantially parallel manner and connecting wall means interconnecting said side walls so as to form a luggage space bounded on the bottom by said connecting wall means and on the sides by said side walls, each of said side walls extending below said connecting wall means, wherein said guide member means are connected to said side walls at positions disposed below said connecting wall means, and wherein said seat extends along the top of said side walls to close off said luggage space from above.

2. A one-track sliding vehicle according to claim 1, wherein a supporting tube for receiving the steering mechanism is provided on and extends over the entire height of the supporting frame, said supporting tube and said supporting frame being a single piece, integrated structure.

3. A one-track sliding vehicle according to claim 2 wherein the supporting tube is provided with sockets at both ends thereof.

4. A one-track sliding vehicle according to claim 1, wherein a spring element is operatively connected between the supporting frame and said one runner.

5. A one-track sliding vehicle according to claim 1, wherein said guide member means includes a plurality of guide elements which are substantially parallel to one another and which are pivotally connected between the supporting frame and said one runner.

6. A one-track sliding vehicle according to claim 5, wherein said seat is upholstered and is hingedly attached to said supporting frame and serves to seal off at least said luggage space.

7. A one-track sliding vehicle according to claim 1, wherein said seat is hingedly attached to one of said side walls.

8. A one-track sliding vehicle according to claim 7, wherein said seat is upholstered.

9. A one-track sliding vehicle according to claim 8, wherein said guide member means includes a plurality of guide elements which are substantially parallel to one another and which are pivotally connected between the supporting frame and said one runner.

10. A one-track sliding vehicle according to claim 9, wherein a supporting tube for rotatably mounting the steering mechanism is provided at the forward region of the supporting frame and extends over the entire height thereof.

11. A one-track sliding vehicle according to claim 10, wherein said steering mechanism is detachably mounted at said support frame, and wherein said luggage space includes room for accommodating storage of at least portions of said steering mechanism.

12. A one-track sliding vehicle according to claim 1, further comprising a spring member connected to said at least one runner and said support frame, said spring member being connected to said side walls at a position disposed below said connecting wall means.

13. A one-track sliding vehicle according to claim 1, wherein said supporting frame, including said side walls and said connecting wall means, is constructed of synthetic material.

14. A one-track sliding vehicle according to claim 13, wherein said side walls and connecting wall means are formed in one-piece.

15. A one-track sliding vehicle according to claim 1, wherein access means from the outside to said luggage space are provided.

16. A one-track sliding vehicle according to claim 15, wherein said access means includes means for accommodating movement of said seat away from portions of the top of said luggage space.

17. A one-track sliding vehicle according to claim 16, wherein the positions of connection between said guide member means and said side walls are accessible from outside the vehicle.

18. A one-track sliding vehicle according to claim 15, wherein the positions of connection between said guide member means and said side walls are accessible from outside the vehicle.

19. A one-track sliding vehicle according to claim 1 wherein a supporting tube for rotatably mounting the steering mechanism is provided at the forward region of the supporting frame and extends over the entire height thereof.

20. A one-track sliding vehicle according to claim 19, wherein said supporting frame, including said side walls and said connecting wall means, is constructed of synthetic material.

21. A one-track sliding vehicle according to claim 20, wherein said side walls, said connecting wall means and said supporting tube are formed in one-piece.

22. A one-track sliding vehicle according to claim 21, wherein said at least one runner includes a front runner and a rear runner, wherein said guide member means are connected to said rear runner, and wherein said steering mechanism is operatively connected to said front runner for steering said front runner.

23. A one-track sliding vehicle according to claim 22, wherein said steering mechanism is detachably mounted at said support frame, and wherein said luggage space includes room for accommodating storage of at least portions of said steering mechanism.

24. A one-track sliding vehicle according to claim 1, wherein said at least one runner includes a front runner and a rear runner, wherein said guide member means are connected to said rear runner, and wherein said steering mechanism is operatively connected to said front runner for steering said front runner.

25. A one-track sliding vehicle according to claim 1, wherein said steering mechanism is detachably mounted at said support frame, and wherein said luggage space includes room for accommodating storage of at least portions of said steering mechanism.

* * * * *